(12) United States Patent
Bökelund et al.

(10) Patent No.: US 10,519,841 B2
(45) Date of Patent: Dec. 31, 2019

(54) METHOD AND SYSTEM FOR MONITORING OF A PHYSICAL QUANTITY RELATED TO A PARTICULATE MASS IN AT LEAST ONE EXHAUST PIPE

(71) Applicant: SCANIA CV AB, Södertälje (SE)

(72) Inventors: Björn Bökelund, Södertälje (SE); Karolin Erwe, Vällingby (SE)

(73) Assignee: Scania CV AB, Söderälje (SE)

( * ) Notice: Subject to any disclaimer, the term of this patent is extended or adjusted under 35 U.S.C. 154(b) by 343 days.

(21) Appl. No.: 15/302,676

(22) PCT Filed: May 6, 2015

(86) PCT No.: PCT/SE2015/050499
§ 371 (c)(1),
(2) Date: Oct. 7, 2016

(87) PCT Pub. No.: WO2015/171059
PCT Pub. Date: Nov. 12, 2015

(65) Prior Publication Data
US 2017/0030245 A1 Feb. 2, 2017

(30) Foreign Application Priority Data

May 8, 2014 (SE) ...................... 1450544

(51) Int. Cl.
*F01N 11/00* (2006.01)
*F01N 3/021* (2006.01)
(Continued)

(52) U.S. Cl.
CPC ............ *F01N 11/007* (2013.01); *F01N 3/021* (2013.01); *F01N 9/002* (2013.01); *F01N 11/00* (2013.01);
(Continued)

(58) Field of Classification Search
CPC ...... F01N 11/00; F01N 11/002; F01N 11/007; F01N 2550/04; F01N 2560/05;
(Continued)

(56) References Cited

U.S. PATENT DOCUMENTS 7,484,357 B2 * 2/2009 Dollmeyer .............. F01N 3/035
60/274
8,762,034 B2 * 6/2014 Oguri ................. B01D 46/0063
60/276
(Continued)

FOREIGN PATENT DOCUMENTS

DE 102011077097 A1 12/2012
EP 1602806 A1 12/2005
(Continued)

OTHER PUBLICATIONS

International Search Report for PCT/SE2015/050499 dated Sep. 4, 2015.
(Continued)

*Primary Examiner* — Audrey K Bradley
*Assistant Examiner* — Diem T Tran
(74) *Attorney, Agent, or Firm* — Moore & Van Allen PLLC; W. Kevin Ransom

(57) ABSTRACT

Methods and systems are provided to monitor a quantity relating to particulate mass M in at least one exhaust pipe arranged downstream of a combustion engine. A first determination device determines a reduction $\Delta$ of a pressure difference dP over at least one or several particulate filters, arranged downstream of the combustion engine. This reduction $\Delta$ is related to a pressure difference $dP_{ref}$ over one or more corresponding reference particulate filters. A second determination device determines a quantity related to the particulate mass M, based on the determined reduction $\Delta$ of the pressure difference dP and a predetermined correlation
(Continued)

between the reduction Δ and the quantity related to the particulate mass M, so that use of soot sensors in the exhaust pipe may be avoided. A comparison device compares the quantity with a defined threshold value $M_{th}$ and a providing device provides indications related to the comparison.

28 Claims, 8 Drawing Sheets

(51) Int. Cl.
*F01N 9/00* (2006.01)
*F01N 3/10* (2006.01)

(52) U.S. Cl.
CPC ............ *F01N 11/002* (2013.01); *F01N 3/106* (2013.01); *F01N 2550/04* (2013.01); *F01N 2560/05* (2013.01); *F01N 2560/08* (2013.01); *F01N 2570/18* (2013.01); *F01N 2900/0412* (2013.01); *F01N 2900/06* (2013.01); *F01N 2900/1406* (2013.01); *F01N 2900/1606* (2013.01); *Y02T 10/20* (2013.01); *Y02T 10/47* (2013.01)

(58) Field of Classification Search
CPC ......... F01N 2560/08; F01N 2900/0412; F01N 2900/06; F01N 2900/1406; F01N 2900/1606; F01N 3/021; F01N 9/002; F01N 2570/18; F01N 3/106; Y02T 10/47; Y02T 10/20
USPC ........................... 60/274, 276, 295, 297, 311
See application file for complete search history.

(56) References Cited

U.S. PATENT DOCUMENTS

2008/0127636 A1* 6/2008 Dahlgren ................ F01N 9/002
60/295
2012/0144813 A1 6/2012 Yahata et al.

FOREIGN PATENT DOCUMENTS

| EP | 2261474 A1 | 12/2010 |
| EP | 2392792 A2 | 12/2011 |
| GB | 2508667 A | 6/2014 |

OTHER PUBLICATIONS

Written Opinion of the International Search Authority for PCT/SE2015/050499 dated Sep. 4, 2015.
Decision of Rejection from the Korean Intellectual Property Office for Korean Patent Application No. 10-2016-7032448 dated Sep. 21, 2018.
Scania CV AB, Swedish Application No. 1450544-0, Office Action, dated Nov. 25, 2014.
Scania CV AB, International Application No. PCT/SE2015/050499, International Preliminary Report on Patentability, dated Nov. 8, 2016.
Scania CV AB, European Application No. 15788571.6, Extended European Search Report, dated Nov. 28, 2017.

* cited by examiner

METHOD AND SYSTEM FOR MONITORING OF A PHYSICAL QUANTITY RELATED TO A PARTICULATE MASS IN AT LEAST ONE EXHAUST PIPE

CROSS-REFERENCE TO RELATED APPLICATION(S)

This application is a national stage application (filed under 35 § U.S.C. 371) of PCT/SE15/050499, filed May 6, 2015 of the same title, which, in turn claims priority to Swedish Application No. 1450544-0, filed May 8, 2014 of the same title; the contents of each of which are hereby incorporated by reference.

FIELD OF THE INVENTION

The present invention relates to a method, system, and computer program product for monitoring of at least one quantity in relation to a particulate mass in at least one exhaust pipe arranged downstream of at least one combustion engine.

BACKGROUND OF THE INVENTION

The following background description constitutes a description of the background to the present invention, and thus need not necessarily constitute prior art.

Engines, such as for example engines comprised in vehicles or ships, are usually equipped with an exhaust treatment system for purification of exhausts created during combustion in the engine. In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in, for example, vehicles. For example, emission levels of nitrogen oxides NO, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and standards for such applications limit emissions from the combustion engines.

In an effort to comply with these emission standards, the exhausts caused by the combustion of the combustion engine are treated (purified) in an exhaust treatment system. Such exhaust treatment systems often comprise at least one particulate filter, which is arranged to catch particles, such as for example soot particles, in the exhaust stream.

With a well-functioning particulate filter, a sufficiently large portion of the particles in the exhaust stream are caught up in the particulate filter, so that the requirements in the emission standards may be fulfilled. However, the caught up particles are stored in the particulate filter, impacting its filtering function, and accordingly its ability to catch particles. At a certain storage level for the particulate filter, the filter needs to be purified, which may be achieved with a regeneration of the filter. In order to find out when the regeneration should be carried out, according to prior art a pressure difference over the particulate filter was measured. Based on this measurement, a regeneration of the particulate filter was activated where needed. It is, for example, possible to use models for soot build-up, soot oxidation and ash intercalation in the particulate filter, in order to determine when a regeneration should be activated. In prior art, a soot sensor in the exhaust pipe has also been used for vehicles in some markets, in order to measure the particulate mass in the exhaust pipe.

There is also a risk that the particulate filter may be damaged, worn and/or otherwise break, whereby its ability to catch particles may also deteriorate. According to prior art technology, measurements of the pressure difference over the particulate filter, in order to determine whether the particulate filter is intact or whether it is damaged/broken, have been used for on board diagnostic (OBD; On Board Diagnostic). According to the regulatory framework for vehicles meeting the Euro VI requirements for heavy goods vehicles, there is a requirement that an error code must be generated in case of a 40% reduction of the pressure difference in relation to a reference filter, and over a given measuring cycle. Thus, an OBD code indicates whether the particulate filter is damaged/broken. For vehicles equipped with a soot sensor in the exhaust pipe, the soot sensor may be used also at the determination of whether the particulate filter is damaged, worn or otherwise broken by way of measuring the particulate mass in the exhaust pipe with the soot sensor.

BRIEF SUMMARY OF THE INVENTION

The vehicles that, for on board diagnosis of the vehicle, use measurements of the pressure difference over the particulate filter to determine whether the particulate filter is damaged and/or broken, carry out these measurements in order to comply with the above mentioned regulatory requirements, that is to say to find a damaged and/or broken particulate filter. In this case, no estimates are made of the particulate mass M released into the atmosphere from the vehicle, based on the pressure difference over the particulate filter.

Some vehicles use, as mentioned above, a soot sensor in the exhaust pipe for purposes of particulate filter diagnosis, that is to say in order to determine whether the particulate filter is broken and needs to be replaced. Such a soot sensor may also be used to determine the particulate mass M emitted into the atmosphere from the vehicle. However, the use of soot sensors in exhaust pipes has been shown to have several disadvantages. In addition, as mentioned above, not all vehicles are equipped with a soot sensor in the exhaust pipe, since there is not currently any regulatory requirement regarding the discovery of particulate mass and/or soot in the exhaust pipe.

The resistive sensors, electrostatic sensors and other types of sensors, in use today as soot sensors, are expensive. Additionally, these sensors have been developed relatively recently and have a low, and sometimes also uneven, reliability.

Exhaust pipes are a problematic environment for sensors, since the exhausts typically comprise particles that hamper measurements and even soil the sensors. Accordingly, prior art solutions have relied upon measurements made sensors that often were soiled, in an environment where it may be difficult to discern the occurrence of some particles. Additionally, these sensors often need to be replaced, or cleaned, because of the soiling, which means that the use of the sensors becomes costly due to material and labor costs, and because the vehicle must be taken out of service.

Overall, damaged and/or broken particulate filters previously have been identified based on the pressure difference over the particulate filter, so that it has not been possible to obtain any information about emissions of particulate mass. Emissions of particulate mass from the vehicle have instead been determined, for some vehicles and in some markets, based on expensive, inexact and unreliable resistive sensor technology, which used sensors in the exhaust pipe. Such inexact and unreliable determination of particulate mass emissions has meant that there is a risk for emission limit values for particulate mass being exceeded.

It is therefore one objective of the present invention to provide a method and a system, which at least partly resolves one or several of the above mentioned problems with prior art.

The present invention provides a method and a system to monitor a quantity related to a particulate mass M, in at least one exhaust pipe arranged downstream of at least one combustion engine. The system comprises a first determination device, which is arranged to determine a reduction $\Delta$ of a pressure difference dP, over at least one or several particulate filters arranged downstream of the at least one combustion engine. This reduction $\Delta$ is related to a pressure difference $dP_{ref}$ over at least one or several corresponding reference particulate filters. The system also comprises a second determination device, arranged to determine the quantity related to the particulate mass M, wherein the determination is based on the determined reduction $\Delta$ of the pressure difference dP, and on a predetermined correlation between the reduction $\Delta$ and the quantity which is related to the particulate mass M. Thus, the use of one or several soot sensors in the at least one exhaust pipe may be avoided. The system also comprises a comparison device, which is arranged to compare the quantity with a defined threshold value $M_{th}$. The system also comprises a providing device, arranged to provide at least one indication related to the result of the comparison.

With the use of the present invention, through the use of a correlation/relationship between the pressure difference dP and the particulate mass M, one or several indications are obtained, which indicate whether the particulate mass in the at least one exhaust pipe is too high. If the particulate mass is too high, this may be because, for example, the particulate filter is broken. According to the present invention, the determination of whether the particulate mass is too high may be based on changes in the pressure difference over the one or several particulate filters, or over the one or several particulate filters and one or several additional components in the exhaust treatment system.

Through the use of the present invention, a correlation between the pressure difference reduction $\Delta$ over at least one or several particulate filters and the particulate mass M downstream of these one or several particulate filters may thus be obtained and used to determine a level of the particulate mass M, emitted into the atmosphere from the vehicle. Accordingly, an accurate and reliable monitoring of the particulate mass M emitted into the atmosphere may be obtained.

With the use of the present invention, the requirement for the resistive and/or electrostatic soot sensors in the at least one exhaust pipe, which previously has been used in some vehicles to determine the particulate mass in the at least one exhaust pipe, is thus eliminated. The present invention provides a cost effective and reliable solution to the above mentioned problem for prior art systems.

The present invention, at the determination of whether or not the particulate mass in the at least one exhaust pipe is too high, instead uses pressure sensors—which are not as sensitive as the soot sensors and also have a higher reliability—in combination with the correlation/relationship between the pressure difference dP and the particulate mass M. Too high a particulate mass may, for example, be the result of one or several broken particulate filters, as mentioned above.

According to one embodiment, at least one sensor which already today usually is installed in a vehicle for a different purpose, may be used to determine the reduction $\Delta$ of the pressure difference dP over the at least one or several particulate filters. Based on the determined pressure reduction $\Delta$, thanks to the predetermined correlations between the pressure reduction $\Delta$ and the particulate mass M according to the invention, a comparison with the threshold value $M_{th}$ may be made, so that too high a value for the particulate mass M may be identified/discovered. In other words, with the use of the present invention an already existing sensor may be used for a purpose other than the one for which it is intended, which means that the invention may be implemented at a low cost and with little added complexity.

There are different regulatory requirements regarding how large a particulate mass may be present in the at least one exhaust pipe downstream of the particulate filter. One example of such a regulatory requirement is 25 mg/kWh for on board diagnostic in a vehicle (OBD; On Board Diagnostic), which may then be used as the threshold value $M_{th}$ to determine whether the particulate mass is too high in the at least one exhaust pipe. Another example of such a regulatory requirement is 10 mg/kWh for engine certification with an intact particulate filter. Other threshold values may also be used, as described in more detail below.

The present invention accordingly has an advantage in that the comparison with the threshold value $M_{th}$ may be carried out based on a reduction $\Delta$ in the pressure difference, since a correlation between reductions $\Delta$ and particulate mass M, or a quantity related to the particulate mass M, has been determined and may be used. Considerable simplifications and improvements are thus achieved with the use of the present invention, both in relation to costs and reliability, regarding the determination of the particulate mass in the at least one exhaust pipe.

These indications may then be provided to one or several control systems in, for example, a vehicle and/or may be provided to the driver of the vehicle via the driver interface, for example by way of indication with for example a lamp or another instrument.

BRIEF DESCRIPTION OF THE DRAWINGS

The invention will be illustrated in more detail below, along with the enclosed drawings, where similar references are used for similar parts, and where.

DETAILED DESCRIPTION OF PREFERRED EMBODIMENTS OF THE INVENTION

Figure 1:
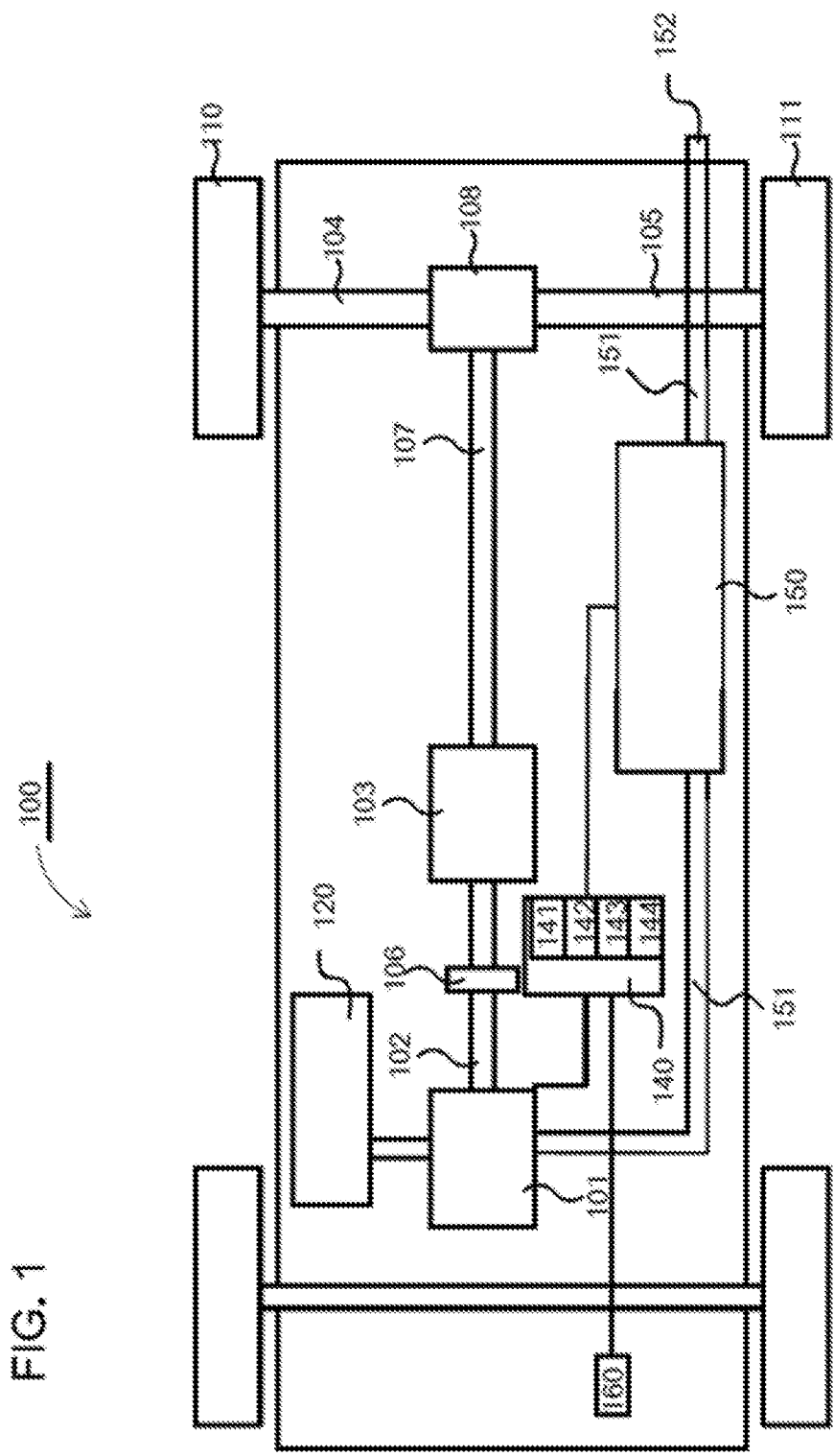
FIG. 1 shows an example vehicle in which the present invention may be implemented.

FIG. 1 schematically shows an example vehicle 100, comprising an exhaust treatment system 150, whereat the vehicle may comprise a system according to the present invention, which is described in more detail below. The vehicle has a powertrain comprising one combustion engine 101, which in a customary manner, via an output shaft 102 on the combustion engine 101, usually via a flywheel, is connected to an a gearbox 103 via a clutch 106. The vehicle's powertrain may also be of another type, such as of a type with a conventional automatic gearbox, of a type with a hybrid powertrain, of a type comprising more than one engine, etc.

An output shaft 107 from the gearbox 103 drives the wheels 110, 111 via a final drive 108, e.g. a customary differential, and the drive shafts 104, 105 connected to said final drive 108.

The vehicle 100 also comprises the above mentioned exhaust treatment system/exhaust purification system 150 for treatment/purification of exhaust emissions resulting from combustion in the combustion chambers, which may consist of cylinders, in the combustion engine 101. The exhausts are led to and from the exhaust treatment system 150 by exhaust pipes 151. The exhausts are then emitted into the atmosphere at the outlet 152. Fuel is supplied to the combustion engine 101 by a fuel system 120.

The vehicle also comprises a control device 140, comprising a first determination device 141, a second determination device 142, a comparison device 143, and a providing device 144 according to the present invention, described in further detail below.

Figure 2:
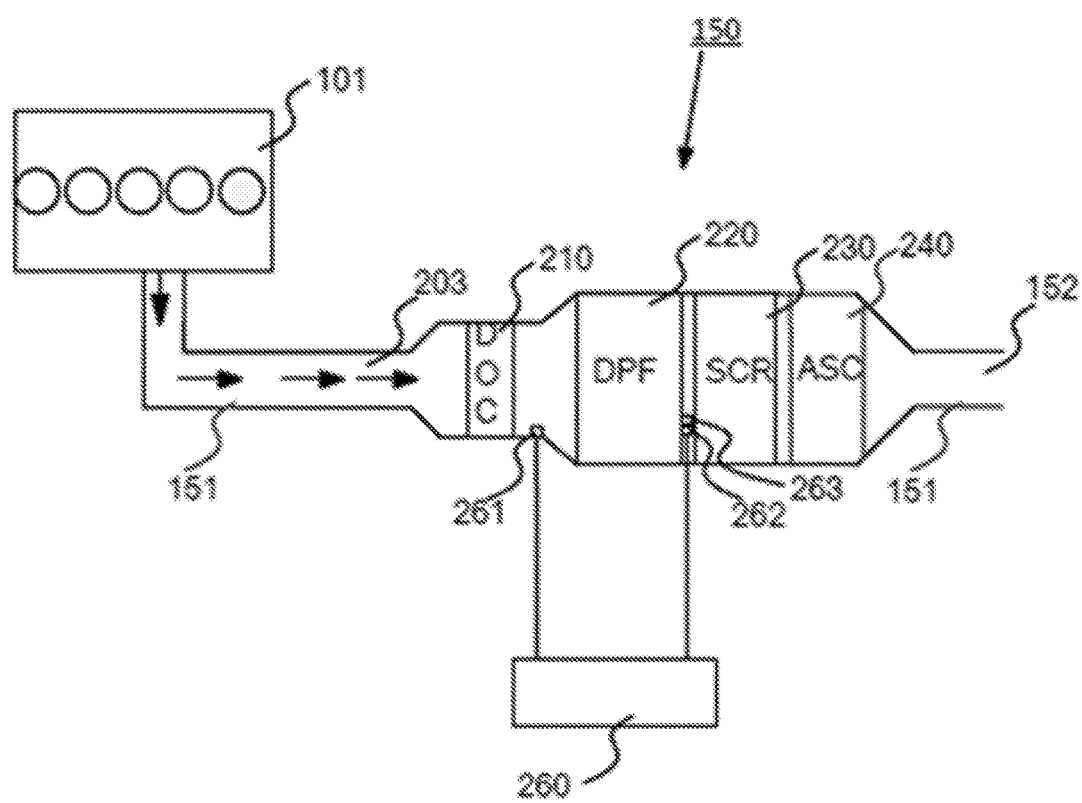
FIG. 2 shows an example of an exhaust treatment system.

FIG. 2 shows an example exhaust treatment system 150, which may for example illustrate a Euro VI-system, and which is connected to a combustion engine 101 via an exhaust conduit/exhaust pipe 151, wherein the exhausts generated at combustion, that is to say the exhaust stream 203, is indicated with arrows. The present invention may also be used in other types of exhaust treatment systems, entailing that the exhaust treatment system 150 in FIG. 2 must be seen as a pedagogical and non-limiting example. For the sake of simplicity, the use of one exhaust pipe is often illustrated and/or described in the figures, and also in parts of the describing text. However, it should be noted that several exhaust pipes may also be used according to different embodiments of the invention, so that the figures and the describing text should be interpreted as illustrating and/or describing at least one exhaust pipe. The exhaust stream 203 is led to a diesel particulate filter (DPF) 220, via a diesel oxidation catalyst (DOC) 210. During combustion in the combustion engine, particles are formed as described above, and the particulate filter DPF 220 is used to catch these particles. The exhaust stream 203 is here led through a filter structure, wherein particles from the exhaust stream 203 are caught passing through, and are stored in the particulate filter 220.

The oxidation catalyst DOC 210 has several functions and is normally used primarily to oxidize, during the exhaust treatment, remaining hydrocarbons $CH_y$ (also referred to as HC) and carbon monoxide CO in the exhaust stream 203 into carbon dioxide $CO_2$ and water $H_2O$. The oxidation catalyst DOC 210 may also oxidize a large fraction of the nitrogen monoxides NO being present in the exhaust stream into nitrogen dioxide $NO_2$. The oxidation of nitrogen monoxide NO into nitrogen dioxide $NO_2$ is important to the nitrogen dioxide based soot oxidation in the particulate filter, and is also advantageous at a potential subsequent reduction of nitrogen oxides $NO_x$. In this respect, the exhaust treatment system 150 further comprises an SCR (Selective Catalytic Reduction) catalyst 230, arranged downstream of the particulate filter DPF 220. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted, however, by the ratio between nitrogen monoxide NO and nitrogen dioxide $NO_2$ in the exhaust stream, so that the reductive reaction is impacted in a positive direction by the previous oxidation of NO into $NO_2$ in the oxidation catalyst DOC.

As mentioned above, the SCR-catalyst 230 requires additives to reduce the concentration of a compound, such as for example nitrogen oxides $NO_x$, in the exhaust stream 203. Such additive is injected into the exhaust stream upstream of the SCR-catalyst 230 (not displayed in FIG. 2). Such additive is often ammonia and/or urea based, or consists of a substance from which ammonia may be extracted or released. Urea forms ammonia at heating (thermolysis) and at heterogeneous catalysis on an oxidizing surface (hydrolysis), within the SCR-catalyst. The exhaust treatment system 150 is also equipped with a slip-catalyst (Ammonia Slip Catalyst; ASC), which is arranged to oxidize an excess of ammonia that may remain after the SCR-catalyst 230. Accordingly, the slip-catalyst ASC may provide a potential for improving the system's total NOx-conversion/reduction. The exhaust stream continues to the exhaust pipe 151, which may thus consist of one or several exhaust pipes, and its outlet part 152, where the exhausts are released into the atmosphere.

It should be noted that FIG. 2 only illustrates one of many exhaust treatment systems for which the present invention may be used. Substantially all exhaust treatment systems comprising one or several particulate filters may use the present invention for diagnosis of the particulate mass M in the at least one exhaust pipe.

The exhaust treatment system 150 also comprises one or several sensors 261, 262 for the determination of a pressure difference dP over the particulate filter, and for some embodiments also over at least one component, other than the particulate filter, in the exhaust treatment system. These sensors 261, 262 may comprise one or several of at least one pressure difference sensor, at least one absolute pressure sensor, or at least one sensor arranged to measure a quantity related to a pressure difference dP over the particulate filter 220, whereat the pressure difference dP may be calculated based on measuring values for this quantity. The sensors 261, 262 may be connected to a control/sensor device 260. It is also possible to measure the ambient pressure, that is to say the atmospheric pressure, and at least one other pressure in the exhaust treatment system, so that the pressure difference dP over the particulate filter 220 may be determined based on the ambient pressure and the at least one other pressure.

If the exhaust treatment system 150 is equipped with a soot sensor for measurement of a particulate mass M, then such soot sensor is arranged downstream of the particulate filter DPF 220. In FIG. 2, a soot sensor 263 is therefore schematically drawn directly downstream of the particulate filter 220, but this soot sensor 263 may obviously be placed in other locations downstream of the particulate filter DPF 220 in the exhaust treatment system 150.

Figure 3:
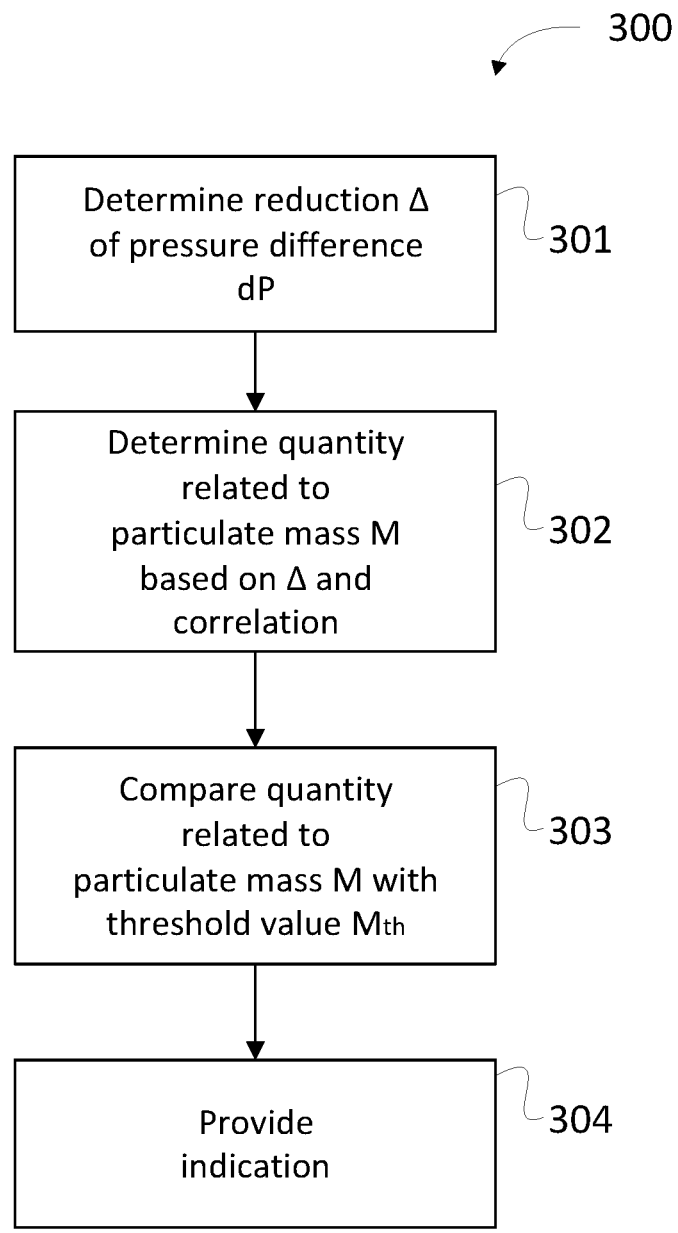
FIG. 3 shows a flow chart for a method according to one embodiment of the present the invention.

FIG. 3 shows a flow chart for the method 300 according to the present invention, which method is used to monitor a quantity related to a particulate mass M in the at least one exhaust pipe 151, arranged downstream of the at least one combustion engine 101. The at least one exhaust pipe 151 leads the exhaust stream from the combustion engine 101 to and between the components in the exhaust treatment system 150, and further on to an outlet 152, where the remaining exhausts are emitted into the surrounding air. With the at least one exhaust pipe 151, this document may thus relate to the part of the at least one exhaust pipe 151 that is arranged between the combustion engine 101 and the exhaust treatment system 150, that is to say downstream of the combustion engine 101 and upstream of the exhaust treatment system 150, the part of the at least one exhaust pipe 151 that is arranged between the components in the exhaust treatment system, and/or the part of the at least one exhaust pipe 151 that is arranged downstream of the exhaust treatment system 150 and in the vicinity of the outlet 152.

In a first step of the method 301, which may for example be carried out with the above mentioned first determination device 141, a reduction $\Delta$ of a pressure difference dP over one or several particulate filters 220 is determined, wherein such reduction $\Delta$ is related to a pressure difference $dP_{ref}$ over at least one or several corresponding reference particulate filters. Such reference particulate filter may according to one embodiment consist of the used particulate filter itself, when this is not used, that is to say before it has been put into operation. The reference particulate filter may according to one embodiment also consist of the used particulate filter itself, after this has been used for a certain time, so that the values for the particulate mass and/or ash in the particulate filter are preferably known, since they impact the pressure difference dP. The reference particulate filter may according to one embodiment also consist of a predetermined standard filter with predetermined characteristics. In other words, the reduction $\Delta$ here represents a difference compared to an optimal and/or normal value for the pressure difference dP over the at least one or several particulate filters 220. The one or several particulate filters 220 are, as described above, arranged downstream of the at least one combustion engine 101 and may, possibly via one or several other exhaust purification components, be connected to the combustion engine 101 via the at least one exhaust pipe 151. According to an embodiment described in further detail below, the reduction $\Delta$ of the pressure difference dP is determined only when the auxiliary condition, stipulating that the volume flow out from the combustion engine 101 must be high, has been met. Thus, according to one embodiment the reduction $\Delta$ of the pressure difference dP may be determined at a certain exhaust volume flow and/or as a function of the exhaust volume flow.

The one or several particulate filters may here comprise one or several particulate filters, which may be arranged in series or in parallel. At least one additional exhaust treatment component, which is not a filter, may also be comprised for the pressure difference dP. Accordingly, the pressure difference dP may here, according to one embodiment, relate to the pressure difference over the one or several particulate filters. Thus, according to another embodiment, the pressure difference dP may here relate to the pressure difference over the one or several particulate filters and over at least one additional component in the exhaust treatment system. This means that existing pressure sensors in the exhaust treatment system 150 and/or in the at least one exhaust pipe 151 may be used by the present invention. The particulate filters may here consist of at least one DPF (Diesel Particulate Filter), at least one half flow filter, at least one full flow filter, at least one TERS-system (Traffic Emission Reduction System), at least one PERS-system (Particle Emission Reduction System), at least one CSF-filter (Catalysed Soot Filter), at least one CDPF-filter (Catalysed DPF) and/or at least one particulate trap.

In a second step 302 of the method, which may for example be carried out with the above mentioned second determination device 142, the quantity related to the particulate mass M to be monitored with the use of the method, is determined. The determination of this quantity is based on the reduction $\Delta$ of the pressure difference dP, determined in the first step 301, and on a predetermined correlation between this reduction $\Delta$ of the pressure difference dP and the quantity related to the particulate mass M. This also means that a use of one or several soot sensors in the at least one exhaust pipe may be avoided.

In a third step 303 of the method, which may for example be carried out with the above mentioned comparison device 143, the quantity related to the particulate mass M, determined in the second step 302, is compared with a defined threshold value $M_{th}$. According to one embodiment of the present invention, the quantity specifically constitutes the particulate mass M, and the defined threshold value $M_{th}$ specifically constitutes a threshold value for the particulate mass, so that a direct control of the level of the particulate mass M level in relation to the threshold value $M_{th}$ may be obtained. According to another embodiment of the present invention, the quantity may instead, for example, constitute an amount of soot and/or smoke, which are both correlated to the particulate mass M, so that the defined threshold value $M_{th}$ constitutes a threshold value correlated to the particulate mass threshold value, whereby an indirect control of the level of the particulate mass M in relation to the threshold value $M_{th}$ may be obtained.

In a fourth step 304 of the method according to the present invention, which may for example be carried out with the above mentioned providing device 144, at least one indication, related to the result of the comparison in the third step 303 of the method, is provided.

With the use of the present invention, one or several indications may thus be provided, which may indicate whether the particulate mass M exceeds the permitted threshold values $M_{th}$, based on changes $\Delta$ in the pressure difference dP over the particulate filter, or over the particulate filter and one or several additional components.

According to the present invention, the quantity related to the particulate mass M to be monitored in order to provide the one or several indicators, is determined based on the determined changes/reductions $\Delta$ in the pressure difference dP over the particulate filter, or over the particulate filter and one or several additional components. Thus, according to the present invention there is no need for the soot sensors in the at least one exhaust pipe, which have been used previously in some applications to determine the particulate mass in the at least one exhaust pipe. The one or several indicators may thus be determined and/or provided also when the at least one exhaust pipe is free of soot sensors, which may also be expressed as eliminating the need for soot sensors downstream of the particulate filter.

In other words, the one or several indicators may be determined and/or provided also when there are no soot sensors downstream of the particulate filter, which means that the quantity related to the particulate mass M, and which must be monitored to provide the one or several indicators, may be determined and/or provided based only on the determined changes/reductions $\Delta$ for the pressure difference dP over the particulate filter, or over the particulate filter and one or several additional components.

With the use of the present invention, a correlation between the pressure difference reduction $\Delta$ over at least one or several particulate filters and the particulate mass M downstream of these at least one or several particulate filters, may thus be obtained and used to determine a level of the particulate mass M, emitted into the atmosphere from the vehicle. When the pressure difference reduction $\Delta$ has been determined, based on the known correlation, the particulate mass M downstream of the particulate filter, which is thus the particulate mass M emitted into the atmosphere, may then be directly determined. The present invention accordingly uses this correlation in order to be able, based on measurements of only pressure differences over the at least one particulate filter and one or several additional components, to determine the particulate mass M emitted into the atmosphere.

The determination of the particulate mass M emitted into the atmosphere is thus based, according to the present invention, only on measurements related to pressure differences carried out with one or several pressure sensors, which also implicitly indicates that these may be made without the use of soot sensors in the one or several exhaust pipes.

In other words, the particulate mass M emitted into the atmosphere from the at least one exhaust pipe is determined based on measurements carried out by sensors placed in other locations in the exhaust treatment system than in the at least one exhaust pipe itself, for instance placed inside or in connection with the particulate filter. Accordingly, the particulate mass M emitted into the atmosphere from the at least one exhaust pipe is determined based on measurements made by pressure sensors arranged upstream of the at least one exhaust pipe, such as placed in connection with the particulate filter. This may also be expressed as the particulate mass M, which is emitted into the atmosphere, being determined based on the correlation/connection with the pressure difference reduction $\Delta$, instead of being determined based on soot sensor measurements in the at least one exhaust pipe.

Accordingly, an accurate and reliable monitoring of the particulate mass M emitted into the atmosphere may be obtained.

When the present invention is used, the use of costly and unreliable soot sensors may thus be avoided at a particulate amount diagnosis, while a more reliable provision of indications is obtained.

The at least one indication, related to the result of the comparison in the third step 303, may consist of a number of different indications intended for different types of recipients. For example, if the soot amount/particulate mass is too high, an indication may be made in a driver interface 160, such as a lamp being lit or changing colors. Accordingly, the driver is informed about the state of the particulate mass and/or the particulate filter and may take suitable action, such as driving the vehicle to a garage if the particulate filters are broken/damaged.

Alternatively, the at least one error code may be indicated in/to at least one system in the vehicle, which bases decisions in the system on this error code. For example, the indication may be provided to a system related to exhaust purification by the at least one exhaust stream 203, via the exhaust treatment system 150, so that the exhaust treatment system may be controlled in as suitable a manner as possible in the conditions specified by the indication, for example based on information that there is too high a particulate mass in the at least one exhaust pipe, which may be due to one of the particulate filters being broken.

The at least one indication may also be provided to a control system related to the at least one combustion engine 101. The at least one indication, which may for example comprise an error code, may then be interpreted by the engine control system as though one or several actions, reducing the particulate mass emitted by the at least one combustion engine 101, must be carried out. Here, for example, the fuel supply from the fuel system 120 may be reduced, which means that less particulate mass/soot is formed and supplied to the exhausts. Other actions reducing the amount of soot/particulate mass in the at least one exhaust pipe 151 may also be taken, such as adjustments of the supply of air to the at least one combustion engine 101, and/or an adjustment of the ignition for the at least one combustion engine 101.

The at least one indication may also be provided to a control system related to the at least one combustion engine 101, wherein the at least one indication of the engine control system is interpreted, as though one or several actions increasing a volume flow emitted by the at least one combustion engine 101, must be carried out. Accordingly, the pressure difference dP may be increased, which results in a more robust and more reliable diagnosis of the particulate filter. For example, an increased volume flow may be obtained by way of achieving an increased engine speed for the at least one combustion engine, which may be controlled by way of increasing the fuel supply, and/or by way of carrying out a down-shift to a lower gear in the gearbox 103.

According to one embodiment, the defined threshold value $M_{th}$ used at the comparison in the above described third step 303 of the method, is related to a statutory requirement for a permitted amount of particulate mass M downstream of the at least one combustion engine 101. The threshold value $M_{th}$ may here, for example, be specified for a permitted amount of particulate mass M downstream of the particulate filter 220, such as at the outlet 152 of the at least one exhaust pipe, where the above mentioned quantity related to the particulate mass M is determined for the corresponding position, that is to say at the outlet 152, in the second step 302 of the method. The threshold value $M_{th}$ may here also be specified for a permitted amount of particulate mass M in another position of the passage of the exhaust stream through the at least one exhaust pipe 151 and/or the exhaust treatment system 150, where the above mentioned quantity related to the particulate mass M is determined for the corresponding position.

According to one embodiment of the present invention, the threshold value $M_{th}$ has a value within the interval 1-100 mg/kWh. According to one embodiment of the present invention, the threshold value $M_{th}$ has a value within the interval 10-30 mg/kWh. According to one embodiment, the threshold value $M_{th}$ has the value 25 mg/kWh; $M_{th}$=25 mg/kWh. In other words, the threshold value $M_{th}$ has a value within the interval 1-100 mg/kWh, preferably a value within the interval 10-30 mg/kWh and more preferably the value 25 mg/kWh. If for example $M_{th}$=25 mg/kWh, at least one error code will be indicated if the value for the quantity related to the particulate mass M, determined in the second step 302, corresponds to a value exceeding 25 mg/kWh. Such error code may then be interpreted by the driver, and/or a control system in the vehicle, as the particulate mass being too high in the at least one exhaust pipe, which as such may be a result of the particulate filter 220 being broken/damaged. Similarly, other threshold values $M_{th}$ are also used within the above specified intervals.

The present invention uses, as described above, a correlation between the reduction Δ of the pressure difference dP and the quantity related to the particulate mass M, in order to determine the value of the quantity related to the particulate mass M in the second step 302 of the present invention. There are various ways of determining the correlation itself. These various ways comprise the use of measurements, for example in test cells, and/or of models for the one or several particulate filters 220.

Such test cells may comprise an engine, or other equipment that emits exhaust streams, as well as measuring equipment to determine for example temperature, exhaust mass flows, the pressure in the exhaust system, and emissions upstream and downstream of the exhaust treatment system 150.

A filter model may, for example, comprise modeling through CFD (computer fluid dynamics), wherein for example exhaust streams, temperatures, pressure, filtering and/or particulate mass may be estimated.

The predetermined correlation between the reduction Δ of the pressure difference dP over the at least one or several particulate filters 220 and the quantity related to the particulate mass M, may, according to one embodiment, be determined by way of determining, in one or several tests, a correlation between the reduction Δ of the pressure difference dP and the quantity related to the particulate mass M; such as by way of measurements, modelings and/or simulations under defined conditions and with different degrees of damage on the at least one or several particulate filters 220. The different degrees of damage to the filters may be achieved by way of performing perforation, piercing, boring, removal of one or several plugs, removal of one or several seals and/or shaking on the filters. The defined conditions for the tests may be defined by one or several of a special length in time for the tests, a special engine speed—corresponding to at least one—type of operation—used at the tests, a special engine torque—corresponding to at least one type of operation—used at the tests, and/or a load—corresponding to at least one type of operation—used at the tests. For example, the defined conditions may be specified by a predetermined cycle for transient operation, such as WHTC (World Harmonized Transient Cycle) and/or by a predetermined cycle for substantially stationary operation, such as WHSC (World Harmonized Stationary Cycle).

Figure 4A:
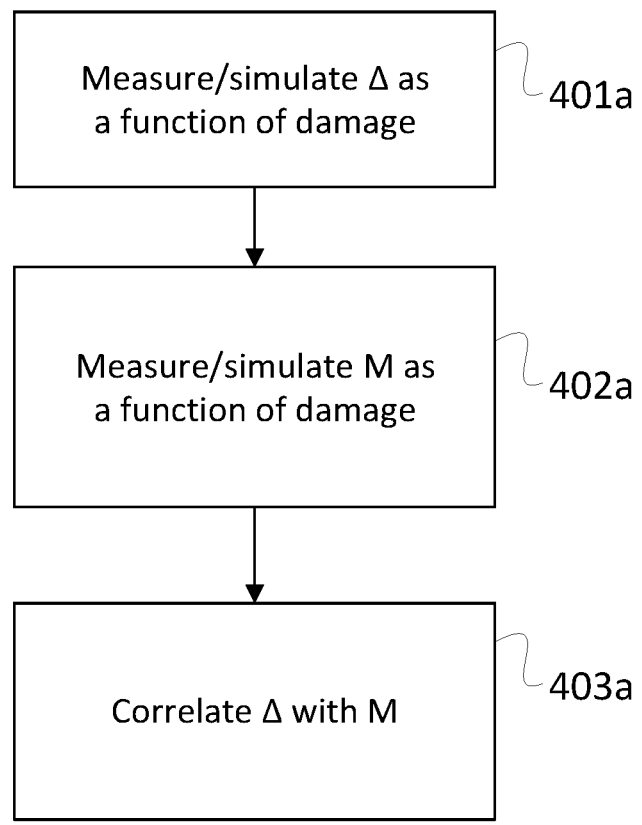
FIG. 4a shows a flow chart for a method according to one embodiment of the present the invention.

The correlation between the reduction Δ of the pressure difference dP and the quantity related to the particulate mass M may be determined with the use of a method according to one embodiment of the present invention, which is illustrated with a flow chart in FIG. 4a.

In a first step 401a of the method, a measurement and/or simulation of at least one value for a reduction Δ of the pressure difference dP as a function of the damage is carried out, for example a hole size on the at least one or several particulate filters 220. As mentioned above, the function may be determined through the measurements of particulate filters with different degrees of damage to the filters, where the damage may be achieved through perforation, piercing, boring, removal of one or several plugs and/or removal of one or several seals.

Figure 5:
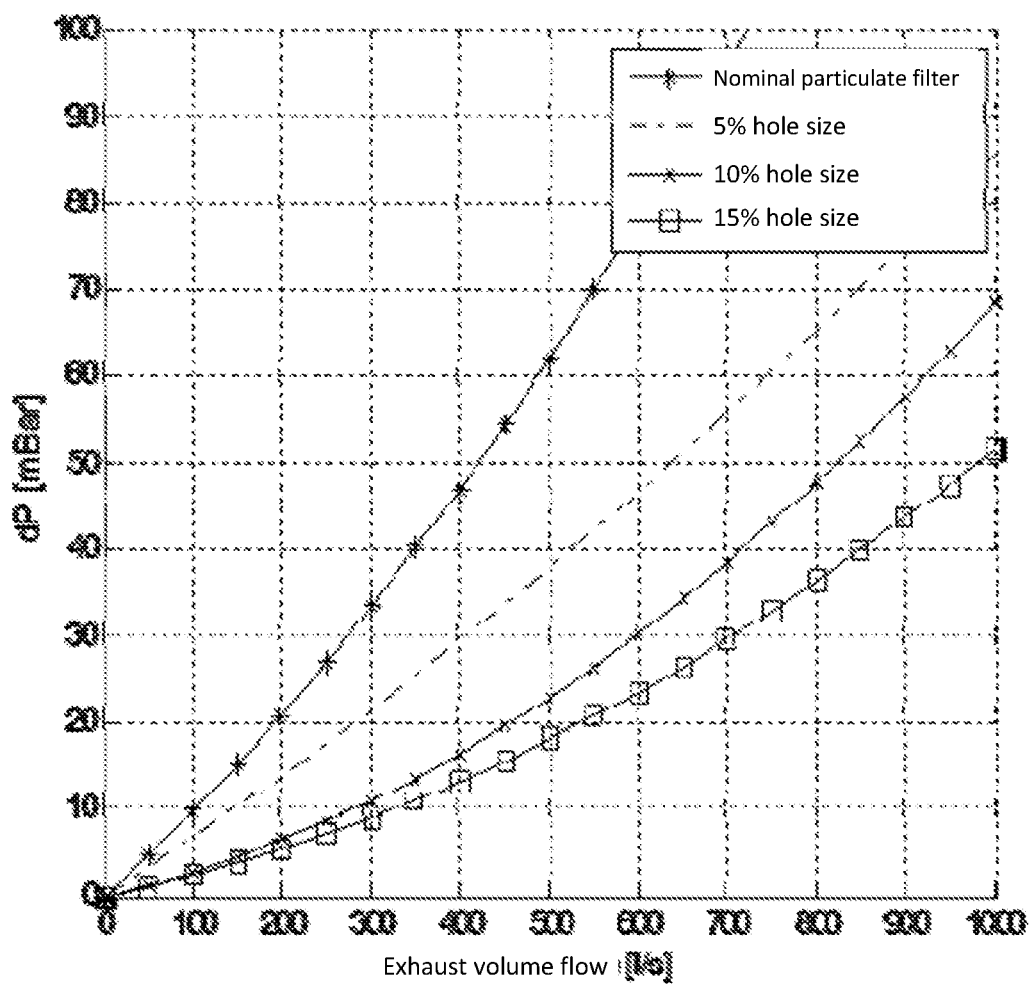
FIG. 5 shows examples of pressure difference as a function of exhaust volume flow.

FIG. 5 shows examples of curves for such measurements and/or simulations. More specifically, FIG. 5 shows a pressure difference dP as a function of exhaust volume flow V for a nominal particulate filter and for particulate filters with different extents of damage. As displayed in the figure, a higher volume flow V results in a larger pressure difference.

The upper curve (stars on the curve) shows values for a nominal particulate filter, which corresponds to the above mentioned reference particulate filter. The second curve from the top (dashed) shows values for a particulate filter with a 5% hole size, which means that 5% of the filter structures are missing. The second curve from the bottom (crosses on the curve) shows values for a particulate filter with a 10% hole size. The bottom curve (squares on the curve) shows values for a particulate filter with a 15% hole size. As illustrated by the figure, the reduction Δ in pressure difference dP, compared with the upper curve for the reference particulate filter, that is to say the different gradients of the various curves, depend on the extent of the damage to the filter, in such a way that the greater the damage to the particulate filter, the greater the reduction Δ in pressure difference dP. In other words, the difference between the values in pressure difference dP between the curve for the reference filter and the other filters, wherein the difference corresponds to the reduction Δ, is, for a given value of the exhaust volume flow, greater where the damage to the filter is greater.

The pressure difference dP in FIG. 5 may be described as a second degree equation, where $k_1$ and $k_2$ are constants and V is the volume flow:

$$dP = k_1 V + k_2 V^2. \quad \text{(equation 1)}$$

In a second step 402a of the method in FIG. 4a, a measurement and/or simulation of a value for the quantity related to the particulate mass M is carried out downstream of the at least one or several particulate filters 220, for example at the outlet 152, as a function of the damage, such as the hole size, on the at least one or several particulate filters 220.

Figure 6:
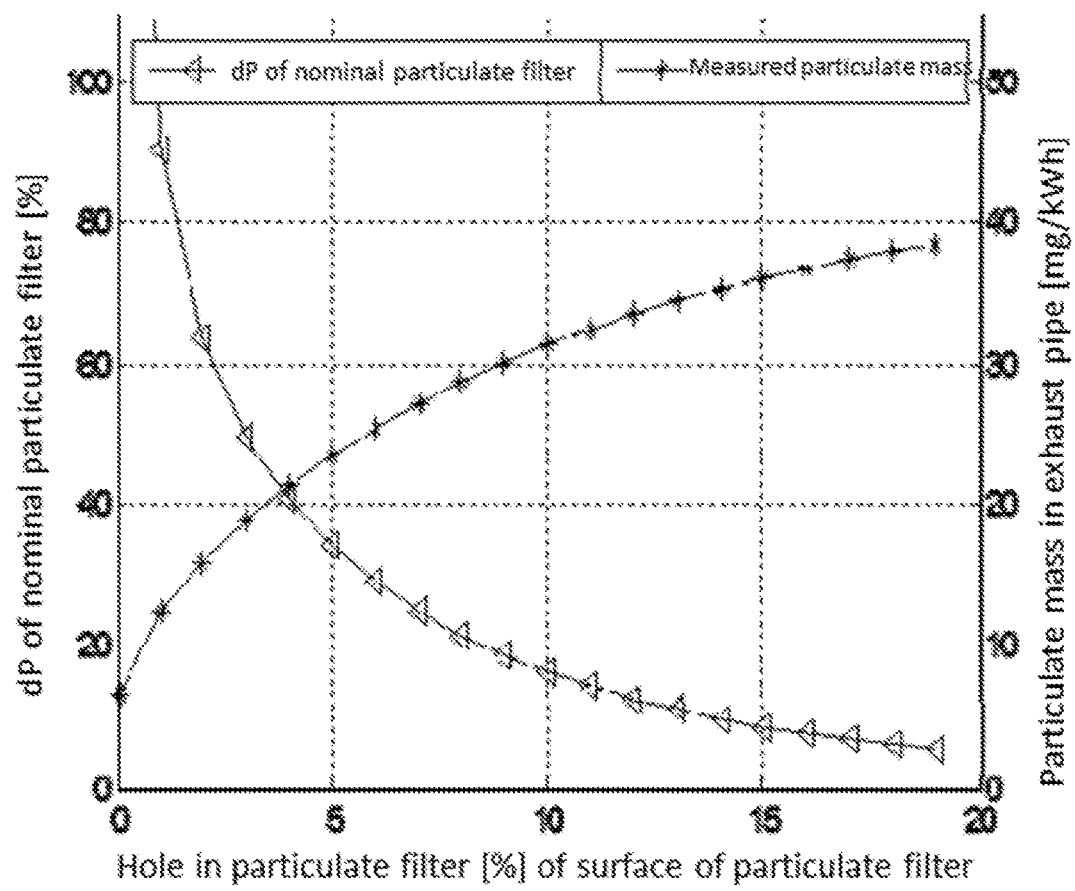
FIG. 6 shows examples of pressure difference reductions and particulate mass M as a function of damage to the particulate filter.

FIG. 6 shows examples of curves for such measurements and/or simulations. More specifically, FIG. 6 shows a curve (with triangles on the curve) for a reduction Δ in pressure difference dP compared with the reference particulate filter, as a function of damage to the particulate filter. This curve is prepared based on data from the first step 401a in FIG. 4a (or the first step 301 in FIG. 3) and FIG. 5.

The figure also shows a measured curve (with stars on the curve) for the quantity related to particulate mass, here exemplified as the particulate mass M downstream of the particulate filter, as a function of the damage, such as the hole size, on the at least one or several particulate filters 220.

Measured/simulated values for the reduction Δ in pressure difference dP in FIG. 6 may be curve adapted according to a function, which may for example be described as equation 2, where a, b and c are constants:

$$f(x) = ae^{xb} x^c. \quad \text{(equation 2)}$$

It should be noted that the appearance of the measured curve (with stars on the curve) for quantity as a function of damage depends on the particulate mass of the exhausts from the combustion engine 101. This means that the appearance of this curve differs for different combustion engines, if the different engines relate to different particulate masses from the combustion engine 101. This also means that the curve obtains a different appearance for one and the same engine, if the engine is calibrated so that the soot value is altered.

In a third step 403a of the method, the measured and/or simulated values are correlated for the reduction Δ of the pressure difference dP with the measured and/or simulated quantity related to said particulate mass M. Thus, a correlation between the reduction Δ of the pressure difference dP and the quantity related to the particulate mass M is obtained, which may be used as the predetermined connection between the reduction Δ of the pressure difference dP and the quantity related to the particulate mass M, according to the present invention. As a non-limiting example, it may be noted that a threshold value corresponding to 25 mg/kWh; Mth=25 mg/kWh; represents a hole of approximately 6% in the particulate filter (the curve with stars in FIG. 6), which in turn represents a reduction Δ of approximately 70% of the pressure difference dP (curve with triangles for 6% hole), as clearly illustrated by FIG. 6.

Thus, according to the invention, since the correlation between the reduction Δ of the pressure difference dP and the quantity related to the particulate mass M is determined, a determined value for the reduction Δ of the pressure difference dP may be directly used to determine, whether the particulate mass M in the at least one exhaust pipe exceeds suitable values.

Figure 4B:
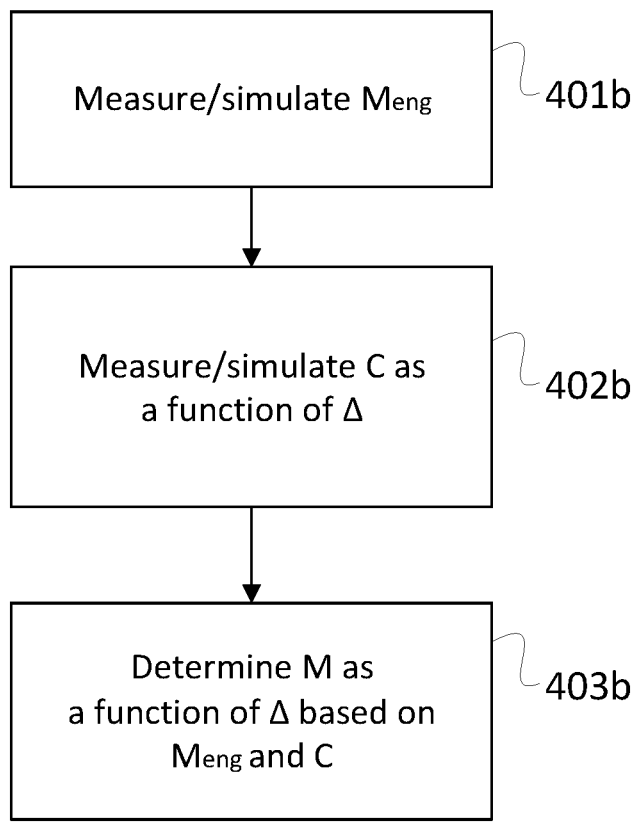
FIG. 4b shows a flow chart for a method according to one embodiment of the present the invention.

The correlation between the reduction Δ of the pressure difference dP and the quantity which is related to the particulate mass M may also be determined with the use of a method according to one embodiment of the present invention, which is illustrated with a flow chart in FIG. 4b.

In a first step 401b of the method, a value for a particulate mass $M_{eng}$, emitted by the at least one combustion engine 101, is measured and/or simulated.

In a second step 402b, at least one value is measured and/or simulated for a filtering capacity C of the one or several particulate filters 220 as a function of the reduction Δ of the pressure difference dP, over the at least one or several particulate filters 220. One way of determining these values is to measure the filtering capacity for different degrees of damage to the filter in a similar manner as described for the first step 401a and FIG. 5 above, that is to say by way of measurements/simulations at different degrees of perforation, piercing, boring, removal of one or several plugs, removal of one or several seals in the filter, cracking, melting and/or shaking. Shaking, as mentioned in this document, may be achieved for example by way of long tests on a test rig or another similar device.

In a third step 403b of the method, the quantity related to the particulate mass M is determined as a function of the reduction Δ of the pressure difference dP over the at least one or several particulate filters 220. The determination is here based on the values for the particulate mass $M_{eng}$ emitted by the at least one combustion engine 101, measured and/or simulated in the first step 401b, and on the values for filtering capacity C measured at the second step 402b. Thus, a correlation is obtained between the reduction Δ of the pressure difference dP and the quantity related to the particulate mass M, which may be used as the predetermined correlation between the reduction Δ of the pressure difference dP and the quantity related to the particulate mass M, according to the present invention.

According to one embodiment of the present invention, the predetermined correlations used are predetermined, that is to say they are determined before they are actually used in, for example, a vehicle during operation. For example, the correlations may be determined at measurements in test cells and/or through modeling, following which data related to these predetermined correlations is stored to be available for use when the quantity related to particulate mass M is monitored according to the present invention.

The determination of the reduction Δ of the pressure difference dP over the at least one or several particulate filters 220 in the first step 301 of the method according to the present invention is, however, carried out, according to one embodiment, during operation of the at least one combustion engine 101, for example while driving a vehicle comprising the present invention.

According to one embodiment of the present invention, at least one sensor 261, 262 is used, arranged to measure the pressure of the at least one or several particulate filters at the determination of the reduction Δ of the pressure difference dP over the at least one or several particulate filters 220. As mentioned above, the exhaust treatment system 150 comprises one or several sensors 261, 262, which are normally used for the determination of a pressure difference over the particulate filter, and for some embodiments also over at least one component other than the particulate filter in the exhaust treatment system. These sensors 261, 262 may comprise one or several of at least one pressure difference sensor, at least one absolute pressure sensor, or at least one sensor arranged to measure a quantity related to a pressure difference dP over the particulate filter 220, wherein the pressure difference dP may be calculated based on measuring values for this quantity. The pressure difference determined with the help of the at least one sensor 261, 262 is usually used for diagnosis of the one or several particulate filters, whereat the diagnosis may indicate that one or several particulate filters 220 should be replaced or regenerated.

Accordingly, with the present invention, the at least one sensor 261, 262, which is already installed in, for example, a vehicle for another purpose, is now also used to determine the reduction Δ of the pressure difference dP over the at least one or several particulate filters 220. Based on this determination of the pressure difference reduction Δ, thanks to the predetermined correlations between the pressure difference reduction Δ and the particulate mass M, a comparison may then be made with the threshold value $M_{th}$, whereby a high soot level in the exhaust pipe may be identified/discovered. In other words, an already existing sensor may be used for another purpose with the use of the present invention, which means that the invention may be implemented at a low cost and with little added complexity.

According to one embodiment of the present invention, a model for a back pressure is used in the at least one or several particulate filters 220 at the determination of the reduction Δ of the pressure difference dP in the above mentioned first step 301 of the method according to the present invention. The determination of the reduction Δ may here be based on the model and on one or several parameters, such as parameters related to exhaust mass flow, exhaust pressure, exhaust temperature, viscosity and particulate filter features. The exhaust mass flow, pressure and temperature may be measured with a sensor, or may be modeled. Hereby, a determination of the reduction Δ is achieved, which at least partly uses already known data in, for example, a vehicle and/or that may be implemented with little added complexity.

According to one embodiment of the present invention, there is an auxiliary condition for when the determination of the reduction Δ of the pressure difference dP should be carried out. The auxiliary condition here is that the volume flow from the combustion engine 101 should be high at the determination of the reduction Δ. This has an advantage in that the signal-noise-relationship for measuring signals is more advantageous at high volume flows, which improves the accuracy of the method and reduces the risk of wrong decisions.

High volume flows for the exhaust stream 203 in this document means flows representing one or several of: flows exceeding 500 liters per second; flows exceeding a bottom flow threshold value related to one or several parameters, such as brand, type, output, number of cylinders and cylinder volume, for the at least one combustion engine, one or several parameters, such as brand and type, for the one or several particulate filters, and/or location of and measuring accuracy for the used sensors; and flows above a bottom flow threshold value and below a top flow threshold value, where said bottom and top flow threshold values have any suitable selected values, for example 200 l/s and 800 l/s, respectively.

For a given exhaust temperature, a given engine speed (for example a percentage of a maximum engine speed) and a given load (for example a percentage of a maximum load), a larger output, more cylinders and/or a larger cylinder volume results in higher volume flows for the exhaust stream, which in turn results in a more advantageous signal-noise-relationship.

In relation to particulate filter parameters, the parameters that contribute to an increased pressure difference over the one or several particulate filters also entail that the signal-noise relationship increases. An increased signal-noise-relationship also means that the flow threshold value may be reduced with retained accuracy. Such particulate filter parameters comprise cell density, plug thickness, wall thickness, material, type of particulate filter and/or changes in the width-length relationship for the at least one particulate filter.

According to one embodiment of the present invention, the reduction $\Delta$ of the pressure difference dP is determined as a function of the exhaust volume flow.

According to one embodiment of the present invention, statistical processing of values obtained through measuring, simulation and/or modeling may take place, which means that the reliability for the method according to the invention increases. Through statistical processing, the impact of incorrect values may be reduced, so that a more robust system is provided. Additionally, inconsistent and incorrect indications are avoided, since measuring/simulation/model-values over a time period may be taken into consideration when the method according to the present invention is carried out.

The statistical processing may for example comprise averaging, median calculation, calculation of a standard deviation and/or filtering. The statistical processing may be carried out for one or several of:
values for the reduction $\Delta$ of the pressure difference dP;
values for a volume flow from the combustion engine 101;
values for an exhaust mass flow from the combustion engine 101, which may be monitored by way of analysing sensor values and/or diagnoses that are used already today by the engine system;
values for the quantity related to the particulate mass M;
values for the filtering capacity C of the one or several particulate filters 220;
values for an exhaust temperature of the combustion engine 101;
values for an exhaust pressure of the combustion engine 101;
values for an inlet temperature for air/gas-mixture into one or several cylinders in the combustion engine 101;
values for an inlet pressure for air/gas-mixture into one or several cylinders in the combustion engine 101;
values for a fuel consumption of the combustion engine 101;
values for an injection pressure of fuel into one or several cylinders in the combustion engine 101;
values for one or several lambda-relationships, that is to say for the air/fuel-relationship in one or several cylinders in the combustion engine;
values for an engine speed in the combustion engine 101; and
values for a load of the combustion engine 101.

A person skilled in the art will realize that a method for monitoring of a quantity related to a particulate mass M in at least one exhaust pipe according to the present invention may also be implemented in a computer program, which when executed in a computer will cause the computer to carry out the method. The computer program usually consists of a part of a computer program product 703, where the computer program product comprises a suitable digital non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 7:
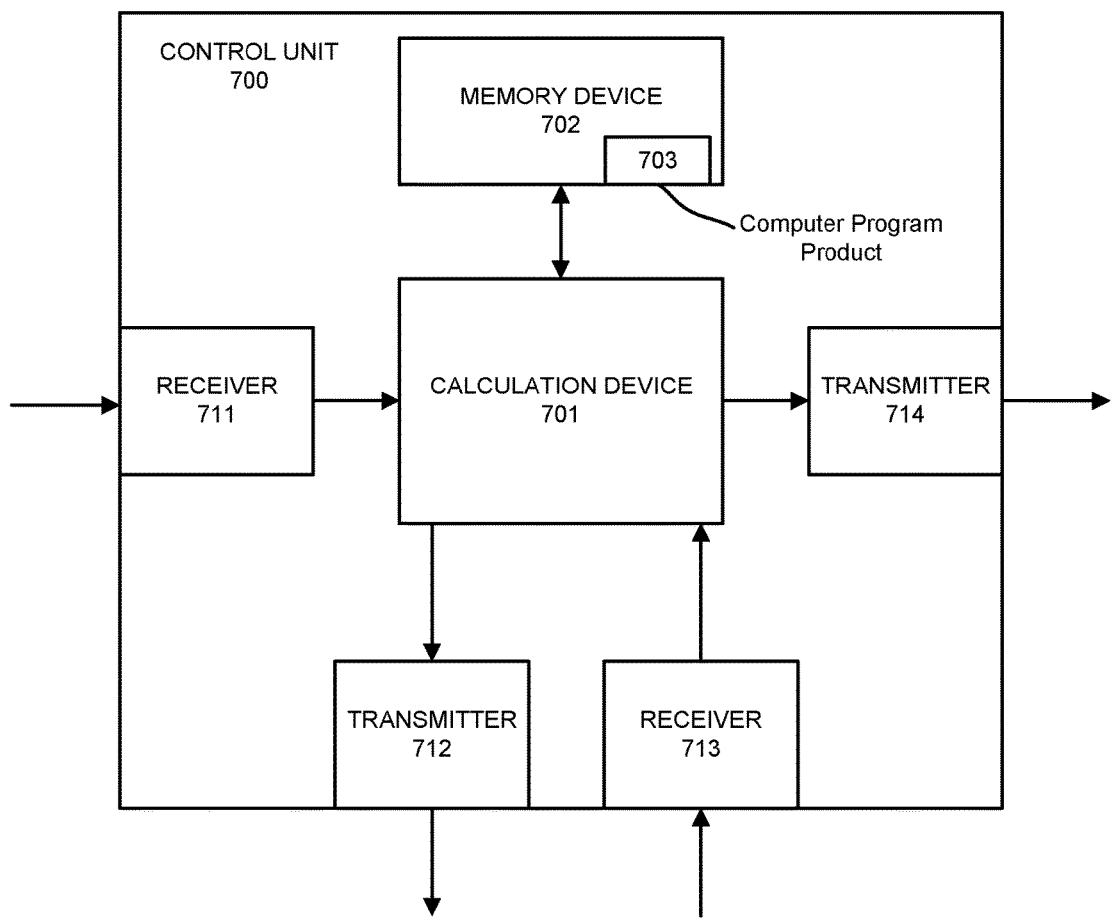
FIG. 7 shows a control device in which the present invention may be implemented.

FIG. 7 schematically shows a control device 700. The control device 700 comprises a calculation unit 701, which may consist of substantially a suitable type of processor or microcomputer, e.g. a circuit for digital signal processing (Digital Signal Processor, DSP), or a circuit with a predetermined specific function (Application Specific Integrated Circuit, ASIC). The calculation unit 701 is connected with a memory unit 702, installed in the control device 700, providing the calculation device 701 with e.g. the stored program code and/or the stored data, which the calculation unit 701 needs in order to be able to carry out calculations. The calculation unit 701 is also arranged to store interim or final results of calculations in the memory unit 702.

Further, the control device 700 is equipped with devices 711, 712, 713, 714 for receiving and sending of input and output signals. These input and output signals may contain wave shapes, pulses, or other attributes, which may be detected as information by the devices 711, 713 for the receipt of input signals, and may be converted into signals that may be processed by the calculation unit 701. These signals are then provided to the calculation unit 701. The devices 712, 714 for sending output signals are arranged to convert the calculation result from the calculation unit 701 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 701, and that the above-mentioned memory may consist of the memory unit 702.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1 and 7, as is well known to a person skilled in the art within the technology area.

The present invention, in the embodiment displayed, is implemented in the control device 700. The invention may, however, also be implemented wholly or partly in one or several other control devices, already existing in the vehicle, or in a control device dedicated to the present invention. A person skilled in the art will realize that the control device may be modified according to the different embodiments of the method according to the invention.

According to one aspect of the present invention a system is provided for monitoring of the above mentioned quantity related to a particulate mass M, which according to one embodiment may consist of the particulate mass M itself, in at least one exhaust pipe 151, arranged downstream of at least one combustion engine 101.

The system comprises the above mentioned first determination device 141, which is arranged for the determination of a reduction $\Delta$ in a pressure difference dP, over at least one or several particulate filters arranged downstream of the at least one combustion engine 101. This reduction $\Delta$ is related to a pressure difference $dP_{ref}$ over at least one or several corresponding reference particulate filters. Accordingly, the reduction $\Delta$ represents a difference between the pressure difference $dP_{ref}$ for the reference particulate filter and the pressure difference dP for the real, at least one, particulate filter. Such reference particulate filter may, according to one embodiment, consist of the used particulate filter itself when it is not used, that is to say before it has been put into operation, or when it has been used for some time, such as described above. The reference particulate filter may, according to one embodiment, also consist of a predetermined standard filter with predetermined characteristics.

The system also comprises the above mentioned second determination device 142, which is arranged to determine a quantity related to the particulate mass M, wherein the determination is based on the determined reduction $\Delta$ of the pressure difference dP and on a predetermined correlation between the reduction $\Delta$ and the quantity related to the particulate mass M.

The system also comprises a comparison device 143, which is arranged for a comparison 303 of the quantity with a defined threshold value $M_{th}$. The system also comprises the above mentioned providing device 144, which is arranged to provide at least one indication related to the result of the comparison. In other words, the providing device may, for example through one or several indications in a driver interface 160, provide an indication as to whether the particulate mass in the at least one exhaust pipe is too high.

The system according to the present invention may be arranged to carry out all of the method embodiments described above and in the claims, wherein the system for the respective embodiment achieves the above described advantages for the respective embodiment.

Here, and in this document, devices are often described as being arranged to carry out steps in the method according to the invention. This also comprises that the devices are adapted and/or set up to carry out these method steps.

In addition, the invention relates to a motor vehicle 100, for example a truck or a bus, comprising at least one system for monitoring of a quantity related to a particulate mass M in at least one exhaust pipe.

The present invention is not limited to the embodiments of the invention described above, but relates to and comprises all embodiments within the scope of the enclosed independent claims.

The invention claimed is:

1. A computer implemented method for monitoring of a quantity of a particulate mass M in at least one exhaust pipe, arranged downstream of at least one combustion engine and downstream of at least one or several particulate filters, and which is emitted into the atmosphere, said method comprising:
   receiving from one or more pressure sensors information regarding sensed pressure in the exhaust system before and after the at least one or several particulate filters arranged downstream of said at least one combustion engine;
   determining, via a computing device, using the sensed pressures, a reduction $\Delta$ of a pressure difference dP at least over one or several of the particulate filters, wherein said reduction $\Delta$ is related to a pressure difference $dP_{ref}$ over the corresponding at least one or several reference particulate filters;
   determining, via a computing device, said quantity of said particulate mass M in the at least one exhaust pipe, based on said determined reduction $\Delta$ of said pressure difference dP, and on a predetermined correlation between said reduction $\Delta$ of said pressure difference dP and said quantity of said particulate mass M;
   comparing, via a computing device, said quantity of said particulate mass M with a defined threshold value $M_{th}$; and
   provisioning at least one indication to a control separate system related to the result of said comparison.

2. The method according to claim 1, wherein said predetermined correlation between said reduction $\Delta$ of said pressure difference dP and said quantity related to said particulate mass M is determined with the use of one or several measurements, models and/or simulations for said at least one or several particulate filters.

3. The method according to claim 1, wherein said predetermined correlation between said reduction $\Delta$ of said pressure difference dP and said quantity related to said particulate mass M is determined through one or several measurements, modelings and/or simulations under defined conditions and with different extents of damage on said at least one or several particulate filters, by determining a correlation between said reduction $\Delta$ of said pressure difference dP and said quantity related to said particulate mass M.

4. The method according to claim 3, wherein said determination of said correlation between said reduction $\Delta$ of said pressure difference dP and said quantity related to said particulate mass M comprises the steps:
   measurement and/or simulation of at least one value for a reduction $\Delta$ of said pressure difference dP as a function of said damage on said at least one or several particulate filters;
   measurement and/or simulation of at least one value for said quantity related to said particulate mass M, at least downstream of said one or several particulate filters, as a function of said damage on said at least one or several particulate filters; and
   correlation of said measured and/or simulated values for said reduction $\Delta$ of said pressure difference dP and of said measured and/or simulated quantity related to said particulate mass M.

5. The method according to claim 3, wherein said determination of said correlation between said reduction $\Delta$ of said pressure difference dP and said quantity related to said particulate mass M comprises the steps:
   measurement and/or simulation of a value for a particulate mass $M_{eng}$ emitted by said at least one combustion engine;
   measurement and/or simulation of at least one value for a filtering capacity C of said at least one or several particulate filters, as a function of said reduction Δ of said pressure difference dP, at different extents of damage to said one or several particulate filters;

determination of said quantity related to said particulate mass M as a function of said reduction Δ of said pressure difference dP, based on said measured and/or simulated values for said particulate mass $M_{eng}$, emitted by said at least one combustion engine and of said filtering capacity C.

6. The method according to claim 3, wherein said defined relationships comprise one or more of:
   a special length in time;
   an engine speed corresponding to at least one type of operation;
   an engine torque corresponding to at least one type of operation;
   a load corresponding to at least one type of operation;
   circumstances specified by a predetermined cycle for transient operation; and
   circumstances specified by a predetermined cycle for stationary operation.

7. The method according to claim 3, wherein said damage on said at least one or several particulate filters at said one or several measurements, models and/or simulations is achieved through one or more from the group of:
   perforation;
   piercing;
   boring;
   removal of one or several plugs;
   removal of one or several seals;
   cracking;
   melting;
   shaking;
   modeling of perforation;
   modeling of piercing;
   modeling of boring;
   modeling of removal of one or several plugs;
   modeling of removal of one or several seals;
   modeling of cracking;
   modeling of melting;
   modeling of shaking;
   simulation of perforation;
   simulation of piercing;
   simulation of boring;
   simulation of removal of one or several plugs;
   simulation of cracking;
   simulation of melting; and
   simulation of shaking.

8. The method according to claim 1, wherein said predetermined correlation has been determined before said determination of said reduction Δ of said pressure difference dP is carried out, so that data related to said predetermined correlation is stored, available for use at said monitoring of a quantity related to a particulate mass M.

9. The method according to claim 1, wherein said determination of said reduction Δ of a pressure difference dP over said at least one or several particulate filters is carried out through the use of at least one sensor, which is arranged for the determination of the pressure in said at least one or several particulate filters.

10. The method according to claim 9, wherein said at least one sensor, arranged for the determination of a pressure in said at least one or several particulate filters comprises one or several from the group of:
    at least one pressure difference sensor;
    at least one absolute pressure sensor; and
    at least one sensor which measures a quantity related to said pressure difference dP, wherein said pressure difference dP is calculated based on said quantity.

11. The method according to claim 9, wherein said pressure, which is determined with said at least one sensor, is also used for diagnosis of said one or several particulate filters.

12. The method according to claim 11, wherein said diagnosis comprises at least one indication that at least one of said one or several particulate filters should be replaced.

13. The method according to claim 11, wherein said diagnosis comprises at least one indication that at least one of said one or several particulate filters should be regenerated.

14. The method according to claim 1, wherein said determination of said reduction Δ of a pressure difference dP over said at least one or several particulate filters is carried out through the use of a model for a back pressure in said at least one or several particulate filters.

15. The method according to claim 1, wherein said at least one indication related to the result of said comparison consists of at least one from among the group of:
    at least one error code is indicated in at least one system;
    at least one indication is activated in a driver interface;
    at least one indication is provided to a system related to exhaust purification of said at least one exhaust stream;
    at least one indication is provided to a control system related to said at least one combustion engine, wherein said at least one indication of said control system is interpreted as though one or several actions reducing a particulate mass emitted by said at least one combustion engine must be carried out;
    at least one indication is provided to a control system related to said at least one combustion engine, wherein said at least one indication of said control system is interpreted as though one or several actions increasing a volume flow emitted by said at least one combustion engine must be carried out.

16. The method according to claim 1, wherein said defined threshold value $M_{th}$ is related to a regulatory requirement for the permitted amount of particulate mass M downstream of said at least one combustion engine.

17. The method according to claim 1, wherein said threshold value $M_{th}$ has a value within the interval 1-100 mgL/kWh.

18. The method according to claim 1, wherein said determination of said reduction Δ of said pressure difference dP over said at least one or several particulate filters is carried out during operation of said at least one combustion engine.

19. The method according to claim 1, wherein said determination of said reduction Δ of said pressure difference dP over said at least one or several particulate filters is carried out during high volume flows from said combustion engine.

20. The method according to claim 19, wherein said high volume flows constitute one from the group of:
    flows exceeding 500 litres per second;
    flows exceeding a bottom flow threshold value related to one or several parameters for said at least one combustion engine and/or said one or several particulate filters;
    flows exceeding a bottom flow threshold value and smaller than a top flow threshold value, wherein said bottom and top flow threshold values have any suitable selected values.

21. The method according to claim 1, wherein a statistical processing is carried out for one or several in the group of:
values for said reduction Δ of said pressure difference dP;
values for a volume flow from said combustion engine;
values for an exhaust mass flow from said combustion engine;
values for said quantity related to said particulate mass M;
values for a filtering capacity C in said one or several particulate filters;
values for an exhaust temperature in said combustion engine;
values for an exhaust pressure in said combustion engine;
values for an inlet temperature for air/gas-mixture into one or several cylinders in said combustion engine;
values for an inlet pressure for air/gas-mixture into one or several cylinders in said combustion engine;
values for a fuel consumption of said combustion engine;
values for an injection pressure of fuel into one or several cylinders in said combustion engine;
values for one or several lambda-relationships;
values for an engine speed of said combustion engine; and
values for a load of said combustion engine.

22. The method according to claim 21, wherein said statistical processing comprises one or several from among the group:
averaging;
median calculation;
calculation of a standard deviation;
filtering; and
data gathering and analysis.

23. The method according to claim 1, wherein said reduction Δ of said pressure difference dP is determined over one or several in the group of:
a DPF (Diesel Particulate Filter);
a half-flow filter;
a full-flow filter;
a TERS-system (Traffic Emission Reduction System);
a PERS-system (Particle Emission Reduction System);
a CSF-filter (Catalysed Soot Filter);
a CDPF-filter (Catalysed DPF);
a particulate trap; and
at least one component, other than a particulate filter, in an exhaust treatment system.

24. The method according to claim 1, wherein said quantity related to said particulate mass M consists of one or several in the group of:
a particulate mass M;
a particulate number;
soot; and
smoke.

25. The method according to claim 1, wherein said threshold value $M_{th}$ has a value within the interval 10-30 mg/kWh.

26. The method according to claim 1, wherein said threshold value $M_{th}$ has a value of 25 mg/kWh.

27. A computer program product comprising computer program code stored on a non-transitory computer-readable medium readable by a computer, said computer program product used for monitoring of a quantity of a particulate mass M in at least one exhaust pipe arranged downstream of at least one combustion engine and downstream of at least one or several particulate filters, and which is emitted into the atmosphere, said computer program code comprising computer instructions to cause one or more computer processors to perform the operations of:
receiving from one or more pressure sensors information regarding sensed pressure in the exhaust system before and after the at least one or several particulate filters arranged downstream of said at least one combustion engine;
determining, using the sensed pressures, a reduction Δ of a pressure difference dP at least over one or several of the particulate filters, wherein said reduction Δ is related to a pressure difference $dP_{ref}$ over the corresponding at least one or several reference particulate filters;
determining said quantity of said particulate mass M in the at least one exhaust pipe, based on said determined reduction Δ of said pressure difference dP, and on a predetermined correlation between said reduction Δ of said pressure difference dP and said quantity of said particulate mass M;
comparing said quantity of said particulate mass M with a defined threshold value $M_{th}$; and
provisioning at least one indication to a control separate system related to the result of said comparison.

28. A system arranged for monitoring of a quantity of a particulate mass M in at least one exhaust pipe arranged downstream of at least one combustion engine and downstream of at least one or several particulate filters, and which is emitted into the atmosphere, said system comprising:
a first determination device configured to:
receive from one or more pressure sensors information regarding sensed pressure in the exhaust system before and after the at least one or several particulate filters arranged downstream of said at least one combustion engine and determine, using the sensed pressures, a reduction Δ of a pressure difference dP over at least one or several of the particulate filters, wherein said reduction Δ is related to a pressure difference $dP_{ref}$ over the corresponding at least one or several reference particulate filters;
a second determination device configured for the determination of said quantity of said particulate mass M in the at least one exhaust pipe, based on said determined reduction Δ of said pressure difference dP and on a predetermined correlation between said reduction Δ of said pressure difference dP and said quantity of said particulate mass M;
a comparison device configured to compare said quantity of said particulate mass M with a defined threshold value $M_{th}$; and
a provision device configured for provision of at least one indication to a control system related to the result of said comparison.

* * * * *

UNITED STATES PATENT AND TRADEMARK OFFICE
CERTIFICATE OF CORRECTION

PATENT NO. : 10,519,841 B2
APPLICATION NO. : 15/302676
DATED : December 31, 2019
INVENTOR(S) : Björn Bökelund and Karolin Erwe Page 1 of 1

It is certified that error appears in the above-identified patent and that said Letters Patent is hereby corrected as shown below:

In the Claims

In Column 18, Claim 1, Line 24:
Please delete the word "separate"

In Column 22, Claim 27, Line 27:
Please delete the word "separate"

Signed and Sealed this
Tenth Day of March, 2020

Andrei Iancu
*Director of the United States Patent and Trademark Office*